Figure 1:
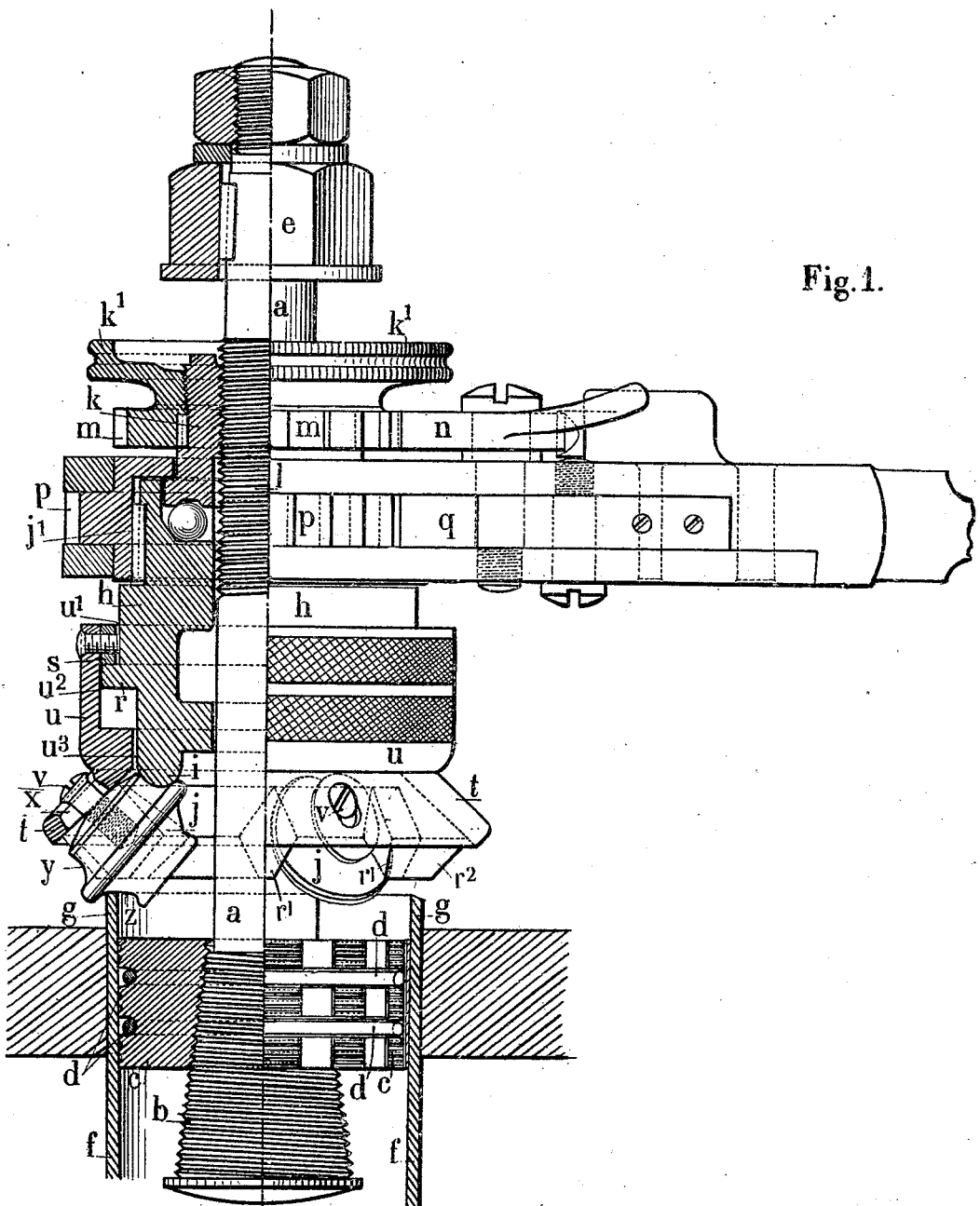

H. E. A. GALLON.
APPARATUS FOR BEADING OR TURNING OVER BOILER TUBES.
APPLICATION FILED APR. 29, 1909.

956,334.

Patented Apr. 26, 1910.

3 SHEETS—SHEET 1.

WITNESSES
G. H. Emslie
J. P. Davis

INVENTOR
Henry Ernest Aristide Gallon
BY Munn & Co.
ATTORNEYS

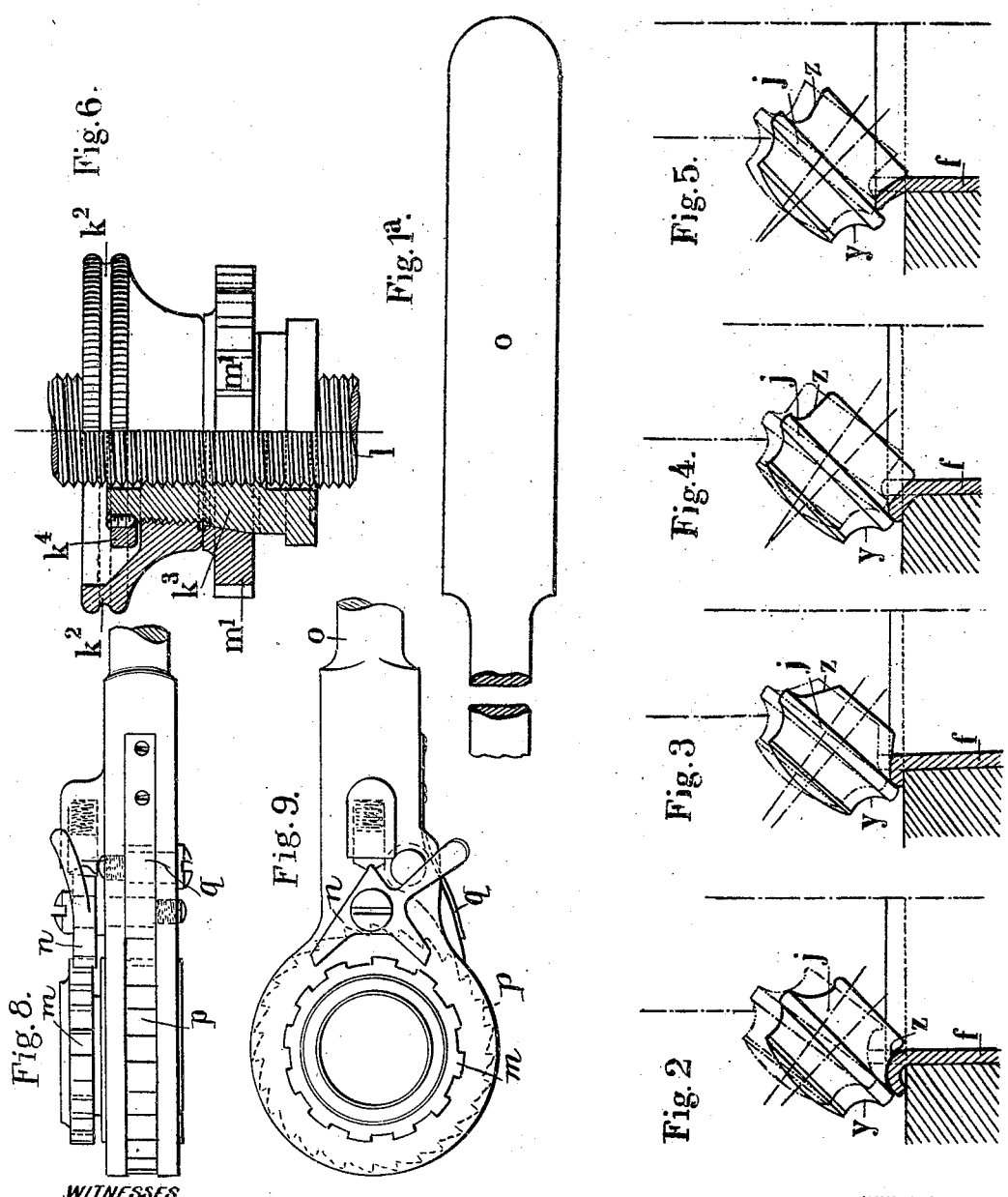

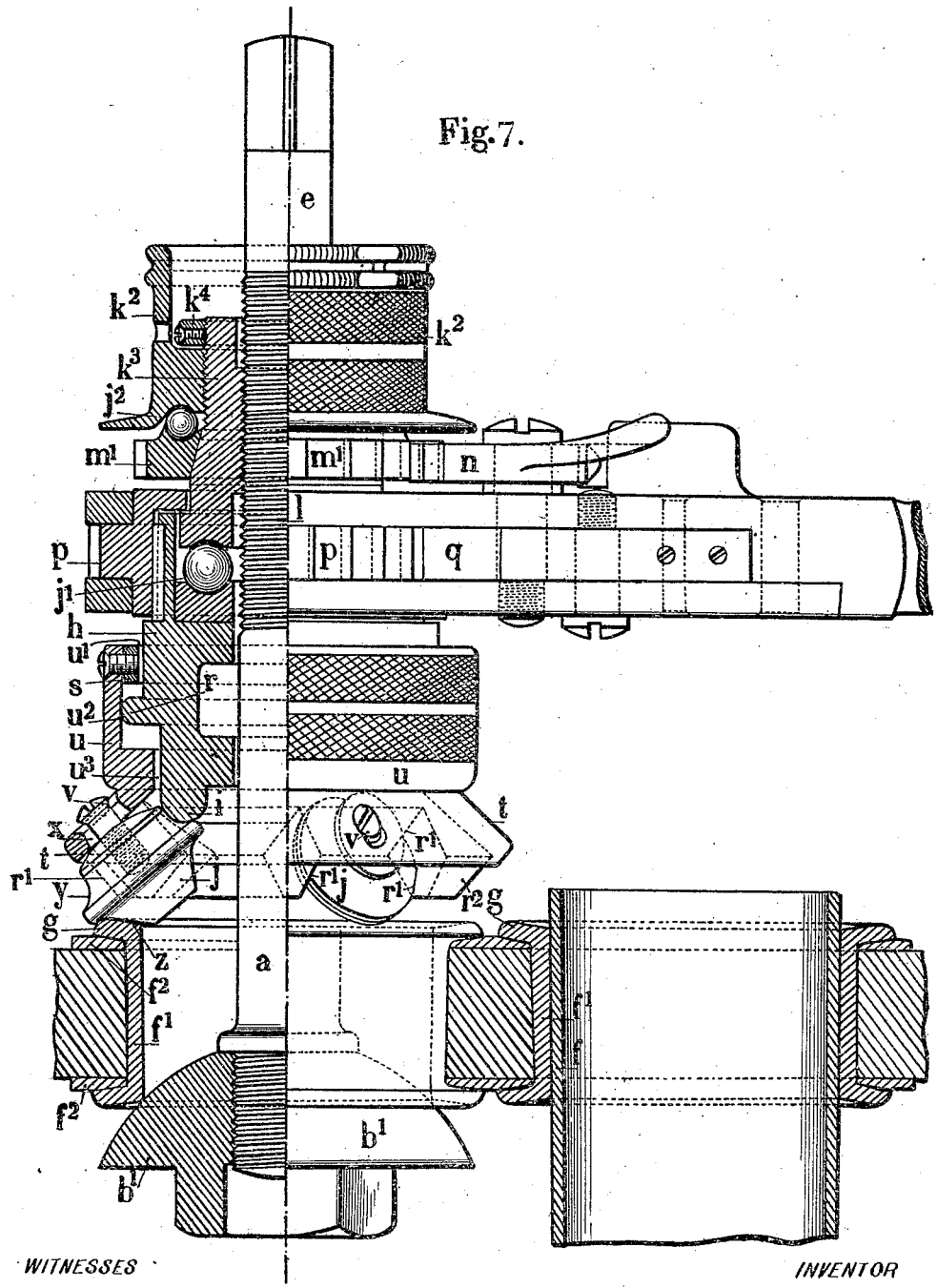

UNITED STATES PATENT OFFICE.

HENRY ERNEST ARISTIDE GALLON, OF SOTTEVILLE-LES-ROUEN, FRANCE.

APPARATUS FOR BEADING OR TURNING OVER BOILER-TUBES.

956,334. Specification of Letters Patent. Patented Apr. 26, 1910.

Application filed April 29, 1909. Serial No. 492,833.

*To all whom it may concern:*

Be it known that I, HENRY ERNEST ARISTIDE GALLON, of 22$^{bis}$ Rue du Cours, Sotteville-les-Rouen, Seine-Inférieure, Republic of France, mechanician, have invented an Apparatus for Beading or Turning Over Boiler-Tubes, of which the following is a full, clear, and exact description.

This invention has for its object an apparatus designed: 1. To bead or turn over on to tube-plates the ends of boiler and like tubes which have been previously expanded, *e. g.* by rolling or drifting, to enable this operation to be carried out rapidly without any shock and to effect a firm attachment of such tubes to the tube-plate. 2. To bead or turn over and to expand steel ferrules on to sheet copper or other ductile metal, this forming a new method of repairing tube-plates. The apparatus permits a heavy compressing force to be obtained which is capable of intimately connecting the surfaces in contact and if required causing the sheet metal to flow.

The apparatus heretofore constructed for the purpose of mechanically beading boiler tubes have been imperfect; more especially they have only been capable of working on very flat plates and on perfectly circular tubes. Moreover they have only been able to produce a single section of flange and have not been capable of resisting the heavy compressive forces which are sometimes necessary. The improved apparatus on the contrary enables work to be done on plates which are out of shape and in oval holes without any trouble, to obtain different sections of flange on tubes which may be of different diameters and of producing on the work rolling forces which are capable of insuring perfect connection of surfaces which are to maintain damaged tube-plates fluid-tight.

This improved apparatus is characterized mainly: 1. By the special arrangement of a supporting box or casing bearing the rollers which, by rolling on this tube, effect the beading or turning over of the end of the tube, or the expanding of ferrules, and the arrangement of the bearings or seats of the rollers, all in such a manner (*a*) as to permit tubes of different diameters to be operated upon, the rollers being capable of being inclined freely to a greater or less degree in the apparatus during work; (*b*) to permit tubes of irregular form to be operated upon, the rollers being capable of moving in an elliptical or a sinuous path; (*c*) permitting rollers of any given dimension and form to be replaced by rollers of another dimension and form, according to the dimensions and forms of the tubes and accordingly as it is desired to bead or turn over the ends of the tubes or to expand the same. 2. By the arrangement of rollers provided with a groove or neck which rests upon a roller-track that affords them the necessary pressure without bearing on the pivot of these rollers and drives them in its circular motion, the said rollers being provided with a second groove or neck which imparts the desired section to the beaded or turned over part of the tube or ferrule; which enables the rollers giving a certain section to the end of the tube to be replaced by others for giving it a different section and with the same apparatus to effect the beading or turning over of the tubes on the furnace-side plate with a rounded section and the beading or turning over on the smoke-box side with an inclined section so as to flare the mouth of the tube, or the straight section for expanding. 3. By the combination, with the parts above defined, of an expanding mandrel which secures itself to the interior of the tube to be beaded, prevents any deformation of this tube during the beading and affords the apparatus the necessary support, or of a tension rod having a hemispherical base designed to afford the apparatus the necessary support, while allowing it to be inclined in any direction during the operation of expanding ferrules on to plates which are very much out of shape, and an operating lever that acts on the one hand on ratchet-gear which produces a progressive depression of the roller-track and on the other hand a second ratchet gear giving this roller-track a rotary motion.

The apparatus is shown, but by way of example only, in the accompanying drawings, in which:

Figure 1 is a view of the apparatus shown half in section and half in elevation. Fig. 1$^a$ is a continuation of Fig. 1. Figs. 2, 3, 4 and 5 show separately several sections of roller. Fig. 6 is a detail view. Fig. 7 is a modification. Figs. 8 and 9 are detail views showing the operating lever, pawls and ratchet wheels.

As shown in this drawing, Fig. 1, the apparatus comprises a central rod *a*, the lower end of which has a taper screw thread $b$. On this thread are mounted split disks $c$ on which are placed elastic rings $d$. The upper part of the rod $a$ bears a head $e$ which may be held at first by hand and then by a spanner in order to turn the rod. In thus turning the rod $a$, the disks $c$ are separated and press tightly against the walls of the tube $f$. These disks then support the tube and preserve it from any deformation during the work of beading or turning over the flange $g$; moreover they afford the apparatus a firm support. Along the rod $a$, there can move a sleeve $h$ which has at its base a circular rim $i$ forming the roller track on which the rollers $j$ bear during work. This sleeve is provided at its upper part with a cup or race in which are arranged balls $j^1$ receiving the pressure of a feed or tightening nut $k$ which screws on a screw-threaded part $l$ of the rod $a$ and is driven by means of a ratchet-wheel $m$ keyed thereto and on which acts a double pawl $n$ carried by an operating lever $o$. A milled head $k^1$ enables the nut $k$ to be turned by hand at the commencement of the operation.

A ratchet-wheel $p$ controlled by a pawl $q$ carried by the operating lever $o$ is keyed to the sleeve $h$ and carries the said sleeve around with it. The sleeve $h$ bears a rib or flange $r$ on which rests a corresponding rib $s$ on the roller-carrying box $u$. A certain amount of play is provided at $u^1$, $u^2$, $u^3$, as shown in the drawing, to permit the box $u$ to incline more or less relatively to the axis of the sleeve $h$. The rollers $j$ are arranged in recesses formed in a flange or rib $r^2$ on the box $u$, and bear on the faces $r^1$ of these recesses. The said rollers are provided with pivots $v$ which are capable of moving freely in recesses $x$ in a flange $t$ on this box $u$. The rollers $j$ have a groove $y$ which bears on the roller-track $i$ and which has a corresponding section, and a groove $z$ which has a section in accordance with that to be given to the bead or turned over part of the tube.

The operation of this apparatus is as follows: Having put the apparatus in place by tightening up the mandrel $c$, as above explained and as shown in Fig. 1, after having given several turns by hand if need be to the nut $k^1$, an oscillating motion is imparted to the lever $o$. The double pawl $n$, which is suitably adjusted, turns the ratchet-wheel $m$ and causes the nut $k$ to screw itself along the rod $a$ and simultaneously to exert pressure by means of the balls $j^1$ on the sleeve $h$ and on the rollers $j$. At the same time, the pawl $q$ turns the ratchet-wheel $p$ and consequently also the sleeve $h$; the roller-track also turns and causes the rollers $j$ to roll on the edge $g$ of the tube $f$. In accordance with the descent of the nut $k$ on the rod $a$, the rollers descend and gradually effect the beading or turning over of the end of the tube, as shown in Fig. 2. When the operation is completed, the direction of the pawl $n$ is changed, which unscrews the nut $k$; the nut $e$ is turned which detaches the mandrel and the apparatus can be withdrawn to pass on to the next tube. From what has been said above, it will be understood that, during work, the box $u$ may be inclined on the sleeve $h$, by reason of the freedom provided. On the other hand, the pivots $v$ of the rollers permit the latter to move away from or to approach the center as required, by inclining themselves relatively to the axis of the roller-track. In these motions, the rollers always rest against the roller-track $i$ and find their lateral support against the vertical walls of the recesses or seats in the box $u$ in which they are arranged. The pivots of these rollers are not subjected to pressure. Similarly, contact of the rib $r^2$ with the periphery of the roller track $i$ takes place when the maximum vertical movement of the box $u$ has been reached, thus limiting the inclination of the rollers $j$ in the case where it is used to limit the extension of the apparatus. By reason of these arrangements, it results that the apparatus will bead without difficulty tubes which have been expanded into elliptical holes or on to rough or unworked plates, to different diameters and whatever be the inequalities of the tubes to be beaded. Moreover, rollers of one section can be substituted for rollers of another section.

Figs. 2, 3, 4 and 5 show, by way of example, several of the sections of bead or flange, which are most in use and the shape of the rollers by means of which they are produced, these latter rollers being capable of being mounted on the apparatus in Fig. 1 in substitution for the rollers $j$.

In the drawing, it is supposed that the sleeve $h$ is made in a single piece. It is evident that it may comprise a roller-track and a cup or race for the balls, which are arranged so as to enable them to be replaced in case of wear. Similarly, instead of effecting the descent of the rollers directly by means of ratchet-gear, use may also be made of a friction device such as is shown in Fig. 6. In this case, a ratchet wheel $m^1$ is fitted with slight friction on the part of a nut $k^3$ made in the form of a frustum of a cone and is held fast thereon by a milled nut $k^2$. In this manner, the screwing down of the sleeve or nut $k^3$ is effected as above described by the action of a double pawl $r$ operating the ratchet-wheel $m^1$, the latter itself driving the nut $k^3$. But if during the operation of beading or turning over the tube, it is necessary temporarily to interrupt the feed, it is then only necessary to loosen the milled nut $k^2$ slightly by hand, in order to release the ratchet-wheel $m^1$ and no longer drive the nut $k^3$. The feed can then be obtained again by moving the milled nut $k^2$ slightly toward the ratchet-wheel $m^1$ and so on without having to vary the position of the double pawl $n$, without interrupting the movement of the lever $o$ and without reducing the amplitude thereof up to the end of the operation. A stop-ring $k^4$ limits the unscrewing motion of the milled nut $k^2$.

The nut $k^2$ and the ratchet-wheel $m^1$ may be separated by a ring of balls, as shown at $j^2$, Fig. 7. In this Fig. 7, there is shown a modification of the apparatus in which, instead of the expanding mandrel, the rod $a$ has a hemispherical base $b^1$. The lower part of the rod $a$ may be arranged to receive at will either the mandrel shown in Fig. 1, or the hemispherical base shown in Fig. 7. The arrangement in Fig. 7, enables tube plates to be repaired by a new method, in cases where the holes in which the tubes are to be fixed are of irregular shape or are enlarged. To effect the repair, plates or sheets $f^2$ of malleable metal, e. g. copper are applied and ferrules $f^1$ are expanded on to these plates or sheets; the beaded or turned over parts of these ferrules firmly grip the copper and cause it to adapt itself to the form of the tube-plate at the same time insuring a fluid-tight joint. To expand one side of the ferrule, it is necessary to bear by means of the base $b^1$ on the other side, as shown in Fig. 7. To the interior of this ferrule one can then bead, by means of the mandrel in Fig. 1, a tube $f$ as shown at the right hand side of Fig. 7.

The above arrangements are only given by way of example; the forms, dimensions and detail arrangements may be varied in all cases without departing from the nature of the invention.

Claims:

1. In an apparatus designed for mechanically beading or turning over tubes and expanding ferrules onto tube-plates and for analogous purposes, rollers having axes and provided with two grooves, one of which expands the tube or ferrule, a movable roller track on which the other groove rests, a roller carrying-box, a sleeve of the apparatus on which the roller-carrying box is movable vertically and laterally, the said box being provided with apertures in which play freely the axes of the rollers.

2. In an apparatus designed for mechanically beading or turning over tubes and expanding ferrules onto tube-plates and for analogous purposes, rollers, axes for the rollers, the rollers having two grooves, one of which expands the tube or ferrule, a movable roller track on which the other groove rests, a roller-carrying box, a sleeve of the apparatus on which the roller-carrying box is movable vertically and laterally, the said box being provided with apertures in which play freely the axes of the rollers, and a hemispherical base intended to take a bearing on the base of the tube or ferrule.

3. In an apparatus designed for mechanically beading or turning over tubes, and expanding ferrules onto tube-plates and for analogous purposes, rollers with two grooves, one of which expands the tube or ferrule, a movable roller track on which the other groove rests, axes for the rollers, a roller-carrying box, a sleeve of the apparatus on which the roller-carrying box is movable vertically and laterally, the said box being provided with apertures in which play freely the axes of the rollers, a ball bearing which takes a bearing on the sleeve, a nut $k^3$ resting on the ball bearing, a crown which can be wedged on the nut $k^3$, and a nut for wedging the crown when screwed downward.

The foregoing specification of my apparatus for mechanically beading or turning over boiler and like tubes and for expanding metal ferrules on tube-plates, signed by me this twentieth day of April, 1909.

HENRY ERNEST ARISTIDE GALLON.

Witnesses:
 DEAN B. MASON,
 R. EHIRIOT.